Oct. 2, 1928.

S. G. NYE 1,686,293

TELEGRAPH INDICATOR

Original Filed Dec. 15, 1921

Sherman G. Nye   INVENTOR.

BY

Mason Fenwick & Lawrence
ATTORNEY.

Patented Oct. 2, 1928.

1,686,293

UNITED STATES PATENT OFFICE.

SHERMAN G. NYE, OF COLORADO SPRINGS, COLORADO, ASSIGNOR OF ONE-HALF TO D. B. SIMON AND ONE-FOURTH TO AMELIA MANN, WILLIAM MANN, HELEN MANN, AND FREDA MANN, ALL OF DENVER, COLORADO.

TELEGRAPH INDICATOR.

Application filed December 15, 1921, Serial No. 522,641. Renewed February 23, 1928.

This invention relates to new and useful improvements in telegraphic instruments and more particularly to a device used for indicating the current impulses which are passing through the instrument by means of the usual well known code form which is familiar to telegraphic operators and which can be read the same as though received direct from the telegraph sounder in the regular way and at the same time provide an indicator which will indicate to the operator whether or not the instrument is alive.

With the above and other objects in view the invention consists in the novel features of construction, combination and arrangement of parts hereinafter more fully set forth, pointed out in the claims and shown in the accompanying drawings in which:

Referring now more particularly to the drawings, the numeral 1 indicates a base upon which the telegraphic instrument is supported, said relay instrument being in the present instance of the well known type of telegraphic relay instruments including a magnet 2 having an armature 3 of a relay of the well known type disposed at one end thereof.

Figure 1:
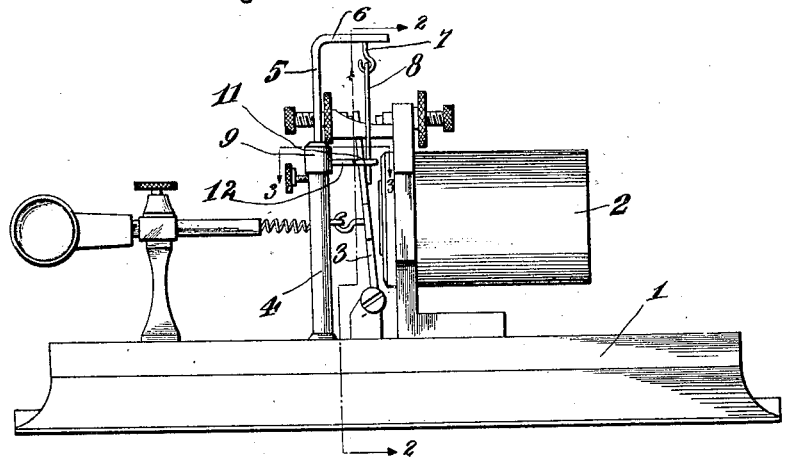
Figure 1 is a side elevation of the usual type of telegraphic relay instrument illustrating my attachment applied thereto.
Figures 2, 4:
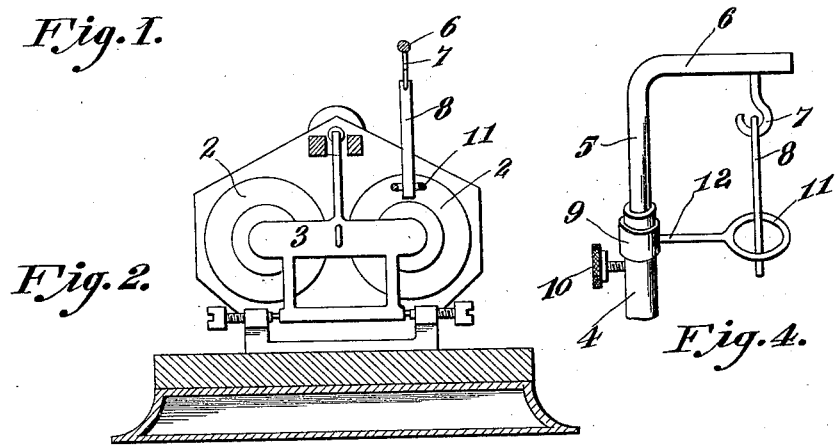
Fig. 2 is a sectional view taken on the line 2—2 of Fig. 1.
Fig. 4 is a detail perspective view of the indicator itself.
Figure 3:
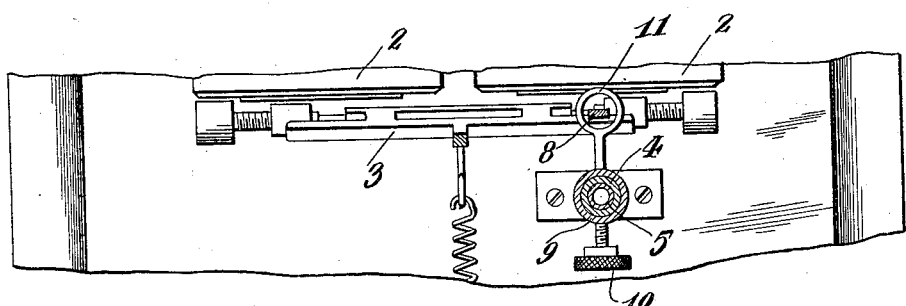
Fig. 3 is a sectional view taken on the line 3—3 of Fig. 1.

My improved indicator comprises in detail, a tubular standard 4 mounted upon the base 1 in front of the instrument and preferably arranged in close proximity to one of the magnets 2 as is clearly illustrated in Fig. 2. Mounted for vertical sliding movement within this standard 4 is the vertical portion 5 of an angular bar, the horizontal portion 6 of which bridges the space between the standard 4 and the magnet 2 at a point above the standard and has a hook member 7 suspended from the horizontal portion 6 at a point adjacent the outer end thereof. Suspended from the hook 7 is a leaf indicator 8, which will be drawn toward the magnet 2 as the impulses of current pass through the magnet.

The member 5 is adjustable within the standard 4 and secured in various vertically adjusted positions by means of a set screw 10 which extends through the wall of the standard 4 and binds against the member 5 to retain the same in an adjusted position.

Mounted upon the standard 4 at the upper end thereof is a sleeve 9 having an arm 12 projecting outwardly at right angles thereto and provided at its outer end with a ring 11 adapted to surround the leaf indicator 8 so that when the indicator 8 is drawn toward the magnet 2, the leaf striking against the ring 11 will produce an audible signal. The fact that the ring 11 is mounted at the end of the supporting rod which is attached to the post 4 makes it sound more clearly than were it mounted rigidly immediately adjacent to the post 4. The ring therefore acts more or less like a sounding fork. From this it will be apparent that impulses passing through the magnet 2 in the code form familiar to telegraph operators, will be indicated through the leaf 8 being drawn toward the core and even though these vibrations are not strong enough to move the leaf into contact with the ring 11, they will be visible to the operator and he can read the same as though they were received direct from the sounder in the regular way.

It will be understood that the impulse currents which operate the leaf member 8 are comparatively feeble requiring close attention of the operator at the receiving instrument to enable the operator to read the vibrations passing through his instrument to the receiving ring attachment. This device provides a never failing circuit indicator, always pointing out to the operators the wire condition and perfect adjustment of his instrument as the operator can readily see at a glance the condition of his instrument and the circuit and whether or not they are working in conjunction with each other and are properly functioning.

Usually telegraph relay instruments are so adjusted that even though the battery be alive the instruments will be unaffected perceptibly, and the operator unable to tell whether the battery is alive or not. It will be obvious that by reason of mounting the leaf member 8 and its light weight that this attachment will be affected by the current when the instrument itself itself will be unaffected and that the vibrations of this leaf will be visible to the operator and indicate to him the condition of the wire. It will also be apparent that by supporting the ring member 11 in a position to surround the lower end of the leaf member 8, the leaf when vibrated through the impulses passing through the magnet, will tend to be forced into contact with the ring 11 and thus produce an audible signal in addition to the visible signal. The device also provides means whereby the regular code form may be conveyed to the operator when the instrument itself is unaffected, because if there be sufficient life in the battery to convey the impulses to the leaf member 8, the leaf member will strike against the ring 11, thus picking up the current impulses which are passing through the magnet in the code form so that they may be read by the operator the same as though received through the telegraph sounder in the regular way.

I claim:

1. In combination with a relay, a standard at one end thereof, an angular member one end of which is adjustable within the standard and the other end of which projects at right angles thereto, a ring arranged a substantial distance from said standard in parallel relation to said last named end of said angular member and carried by a rod the opposite end of which is supported by said standard, thus enabling said ring to act as a sounding ring, and a leaf detector supported by said angular member and disposed within said ring, whereby the vibrations of said detector causes the same to impinge against the ring and the sounds formed thereby to be clarified and amplified.

2. In combination with a relay, an indicator including a tubular standard supported adjacent the relay, an angular member one end of which is adjustable within the standard and the other end of which projects horizontally at right angles thereto, a ring arranged a substantial distance from said standard in parallel relation to said last named end of said angular member and carried by a rod the opposite end of which is supported by said standard, thus enabling said ring to act as a sounding ring, a hook member carried by the horizontal portion of the angular member, and a leaf detector suspended from said hook member and disposed within the said ring, whereby the vibrations of said detector, when the relay is energized, causes the same to impinge against the ring and the sounds resulting therefrom to be clarified and amplified.

In testimony whereof I affix my signature.

SHERMAN G. NYE.